US008984803B2

(12) United States Patent  (10) Patent No.: US 8,984,803 B2
Covington  (45) Date of Patent: Mar. 24, 2015

(54) SINGLE-LATCH LOCK AND RODENT TRAP WITH SINGLE-LATCH LOCK

(75) Inventor: Larry Covington, Weatherford, TX (US)

(73) Assignee: VM Products Inc., Bedford, TX (US)

( * ) Notice: Subject to any disclaimer, the term of this patent is extended or adjusted under 35 U.S.C. 154(b) by 190 days.

(21) Appl. No.: 13/697,310

(22) PCT Filed: May 10, 2010

(86) PCT No.: PCT/US2010/034242
§ 371 (c)(1),
(2), (4) Date: Jan. 28, 2013

(87) PCT Pub. No.: WO2011/142740
PCT Pub. Date: Nov. 17, 2011

(65) Prior Publication Data
US 2013/0118056 A1    May 16, 2013

(51) Int. Cl.
*A01M 25/00* (2006.01)
*E05B 65/00* (2006.01)
*E05B 19/00* (2006.01)
*E05B 35/00* (2006.01)
*E05C 19/06* (2006.01)

(52) U.S. Cl.
CPC ............ *E05B 65/006* (2013.01); *A01M 25/004* (2013.01); *E05B 35/008* (2013.01); *E05C 19/06* (2013.01); *E05B 19/0047* (2013.01)
USPC ................... 43/131; 70/160; 70/403; 70/404; 222/153.03

(58) Field of Classification Search
USPC ...................... 43/131; 70/160, 162, 403, 404; 222/153.03
See application file for complete search history.

(56) References Cited

U.S. PATENT DOCUMENTS

| 3,112,637 | A | 12/1963 | Thomas | 70/258 |
| 4,991,413 | A * | 2/1991 | Arnaldo | 70/19 |
| 5,040,327 | A | 8/1991 | Stack et al. | 43/131 |
| 5,379,912 | A | 1/1995 | Wolf | 220/481 |
| 5,411,163 | A | 5/1995 | Gueret | 220/326 |
| 5,806,237 | A | 9/1998 | Nelson et al. | 43/131 |
| 5,857,286 | A | 1/1999 | Doucette | 43/131 |
| 6,006,941 | A | 12/1999 | Hitchings | 220/284 |
| 6,082,042 | A | 7/2000 | Issitt | 43/131 |
| 6,182,482 | B1 | 2/2001 | Issitt | 70/160 |
| 6,397,517 | B1 | 6/2002 | Leyerle et al. | 43/131 |
| 6,598,742 | B1 | 7/2003 | Belden et al. | 206/308.2 |
| 6,874,274 | B2 | 4/2005 | Townsend | 43/131 |
| 7,165,427 | B1 * | 1/2007 | Lai | 70/159 |
| 7,377,141 | B2 | 5/2008 | Javaux et al. | 70/168 |
| 8,561,847 | B2 * | 10/2013 | Rosenkranz et al. | 222/153.03 |

(Continued)

FOREIGN PATENT DOCUMENTS

WO   WO 98/10645    3/1998
WO   WO 2005/006857    1/2005

OTHER PUBLICATIONS

International Preliminary Report on Patentability issued in PCT Application No. PCT/US2010/034242, dated Nov. 13, 2012.

(Continued)

*Primary Examiner* — Bret Hayes
(74) *Attorney, Agent, or Firm* — Norton Rose Fulbright US LLP

(57) ABSTRACT

Locks for use with pest-control devices such as bait stations or other loadable devices, kits that include a lock and key, and pest control devices that include a lock.

13 Claims, 10 Drawing Sheets

(56) References Cited

U.S. PATENT DOCUMENTS

| | | | |
|---|---|---|---|
| 8,720,107 B1 * | 5/2014 | Vickery | 43/131 |
| 2002/0194774 A1 * | 12/2002 | Lund et al. | 43/131 |
| 2004/0244274 A1 | 12/2004 | Dellevigne et al. | 43/131 |
| 2005/0262892 A1 | 12/2005 | Parsons et al. | 70/16 |
| 2006/0117644 A1 | 6/2006 | Hoyes et al. | 43/131 |
| 2006/0123860 A1 * | 6/2006 | Gahlhoff et al. | 70/168 |
| 2008/0072475 A1 | 3/2008 | Nelson et al. | 43/131 |
| 2008/0110894 A1 | 5/2008 | Tissington et al. | 220/326 |
| 2009/0139133 A1 | 6/2009 | Harper | 43/131 |
| 2010/0031557 A1 | 2/2010 | Vickery et al. | 43/131 |

OTHER PUBLICATIONS

International Search Report and Written Opinion issued in PCT Application No. PCT/US2010/034242, mailed Jan. 18, 2011.

* cited by examiner

FIG. 5B  FIG. 5C

SINGLE-LATCH LOCK AND RODENT TRAP WITH SINGLE-LATCH LOCK

CROSS REFERENCE TO RELATED APPLICATIONS

This application is a national phase application under 35 U.S.C. §371 of International Application No. PCT/US2010/034242 filed May 10, 2010, which is incorporated herein by reference in its entirety.

BACKGROUND

1. Field of the Invention

The present invention relates generally to loadable pest-control devices and, more particularly, but not by way of limitation, to locks suitable for use with loadable (e.g., reloadable) devices (e.g., rodent bait stations).

2. Description of Related Art

Loadable pest control devices (e.g., rodent bait stations) are known in the art, some of which have locks. U.S. Pat. Nos. 6,082,042 and 6,182,482 involve examples of rodent bait stations with locks, and are hereby incorporated by reference in their entireties.

SUMMARY

Some embodiments of the present locks comprise: a first lock portion having a post, two laterally spaced members each defining a barb extending away from the post, and a longitudinal axis extending through substantially the center of the post; and a second lock portion defining an opening and having a latch member on a side of the opening, the latch member having opposing lateral protrusions; where the second lock portion is configured to engage the first lock portion such that: the longitudinal axis of the firs t lock portion extends through the opening, and the lateral protrusions of the latch member contact the barbs of the first lock portion to resist separation of the first and second lock portions; and where the second lock portion is configured to receive a key having shaft with a longitudinal axis such that the shaft of the key extends through the opening and the longitudinal axis of the shaft is angled no more than 30 degrees relative to the longitudinal axis of the post.

Some embodiments of the present locks comprise: a first lock portion having a post, two laterally spaced members each defining a barb extending away from the post, and a longitudinal axis extending through substantially the center of the post; and a second lock portion defining an opening and having a latch member on a side of the opening, the latch member having opposing lateral protrusions; where the second lock portion is configured to engage the first lock portion such that: the longitudinal axis of the first lock portion extends through the opening, and the lateral protrusions of the latch member contact the barbs of the first lock portion to resist separation of the first and second lock portions; and where the second lock portion is configured to receive a key having a shaft with a longitudinal axis, a recess in an end of the key, and a lateral protrusion, such that: if the key is inserted through the opening less than a minimum insertion distance the key is substantially prevented from rotating, and if the key is inserted through the opening between the minimum insertion distance and a maximum insertion distance the key is permitted to rotate such that if the second lock portion engages the first lock portion the lateral protrusion of the key pushes the latch member away from the barbs to permit separation of the first and second lock portions.

In some embodiments, the second lock portion is configured such that if the key is inserted through the opening between the minimum and maximum insertion distances the key is only permitted to rotate in a limited range of rotation. In some embodiments, the second lock portion includes a collar at least partially between the opening and the latch member, the collar defining the limited range of rotation. In some embodiments, the second lock portion includes a collar at least partially between the opening and the latch member, the collar defining the minimum insertion distance. In some embodiments, the collar defines the limited range of rotation. In some embodiments, the opening of the second lock portion has a primary portion and a lateral portion shaped to receive the lateral protrusion of the key, and where the limited range of rotation is between a first position in which the lateral protrusion of the key is aligned with the lateral portion of the opening and a second position in which the lateral protrusion of the key is aligned with the latch member of the first lock portion. In some embodiments, a protrusion extends into the lateral portion toward the primary portion of the opening.

In some embodiments, the latch member has a substantially planar surface, the second lock portion further comprises a web member, and the web member is substantially perpendicular to the substantially planar surface of the latch member. In some embodiments, the web member is coupled to the latch member. In some embodiments, the web member is unitary with the latch member. In some embodiments, the web member is on an opposite side of the latch member than the substantially planar surface. In some embodiments, if the lateral protrusions of the latch member contact the barbs of the first lock portion to resist separation of the first and second lock portions, the web member is substantially parallel to the longitudinal axis of the post of the first lock portion. In some embodiments, the first lock portion and second lock portion each comprises a plastic.

Some embodiments of the present kits comprise: any embodiment of the present locks; and a key comprising a shaft having an end and a longitudinal axis extending through the end, the key defining an opening extending into the shaft from the end; where the key is configured to be inserted into the opening of the second lock portion such that the post of the first lock portion extends into the opening in the shaft and the key can be rotated to spread the latch member to permit separation of the lateral protrusions and the barbs.

In some embodiments of the present kits, at least a portion of the shaft of the key is substantially cylindrical. In some embodiments, the key comprises a protrusions extending outward from the shaft to an outer end. In some embodiments, the protrusions of the key has a width that is less than the maximum transverse dimension of the shaft. In some embodiments, the protrusion of the key has a width that is at least 70% of the maximum transverse dimension of the shaft. In some embodiments, the protrusion is substantially perpendicular to the longitudinal axis of the shaft. In some embodiments, the outer end the protrusion of the key includes a notch extending into the protrusion toward the longitudinal axis of the shaft. In some embodiments, the outer end of the protrusion of the key is configured to contact a planar surface to resist rotation of the key around the longitudinal axis of the shaft. In some embodiments, the outer end of the protrusion of the key is configured to contact a planar surface such that at least two points on the outer end can simultaneously contact the planar surface. In some embodiments, the latch member of the second lock portion has a substantially planar inner surface, and where the key is configured to be inserted into the opening of the second lock portion such that the post of the first lock portion extends into the opening in the shaft, and if the key is rotated such that the protrusion of the key spreads the latch member, the outer end of the protrusion of the key will contact the latch member to resist rotation of the key. In some embodiments, the key comprises a plastic.

Some embodiments of the present pest-control devices comprise: any embodiment of the present locks; a receptacle; and a door coupled to the receptacle. In some embodiments, the door is unitary with the receptacle. In some embodiments, the first lock portion is coupled to the receptacle, and the second lock portion is coupled to the door. In some embodiments, the first lock portion is unitary with the receptacle, and the second lock portion is unitary with the door. In some embodiments, the reloadable pest-control product comprises a rodent bait station. In some embodiments, the pest-control device comprises an insect bait station. In some embodiments, at least one of the receptacle and lid comprises a plastic.

Some embodiments of the present keys comprise: a shaft having an end and a longitudinal axis extending through the end, the key defining an opening extending into the shaft from the end. In some embodiments, at least a portion of the shaft of the key is substantially cylindrical.

Some embodiments of the present keys further comprise a protrusion extending outward from the shaft to an outer end. In some embodiments, the protrusion has a width that is less than the maximum transverse dimension of the shaft. In some embodiments, at least one of the protrusions has a width that is at least 70% of the maximum transverse dimension of the shaft. In some embodiments, the protrusion is substantially perpendicular to the longitudinal axis of the shaft. In some embodiments, the outer end the protrusion includes a notch extending into the protrusion toward the longitudinal axis of the shaft. In some embodiments, the outer end the protrusion of the key is configured to contact a planar surface such that at least two points on the outer end can simultaneously contact the planar surface. In some embodiments, the key comprises a plastic.

Some embodiments of the present kits and pest-control devices include bait, such as bait that is designed to kill or incapacitate a pest, such as a mouse or a rat or an insect.

In any embodiment of the present disclosure, the term "substantially" may be substituted with "within [a percentage] of" what is specified, where the percentage includes 5, 10, and/or 15 percent.

Any embodiment of any of the present devices and kits can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 5A-5C depict various views of the first lock portion of the single-latch lock of FIGS. 3A-3B.

DESCRIPTION OF ILLUSTRATIVE EMBODIMENTS

Figure 1:
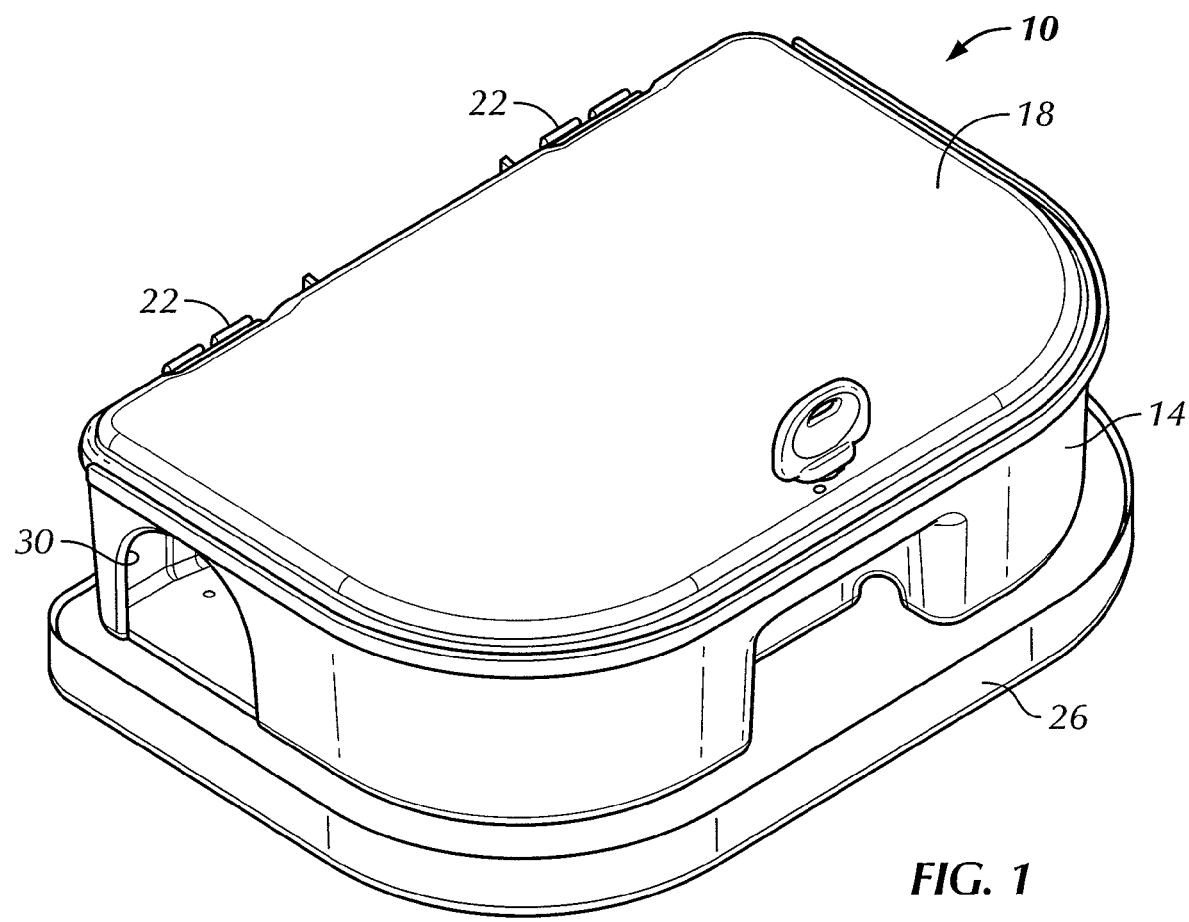
FIG. 1 depicts a perspective view of one of the present rodent bait stations with one of the present single-latch locks.
Figure 2A:
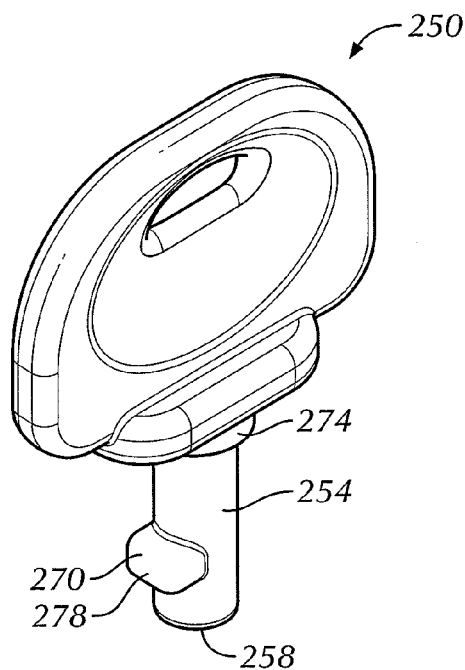
FIGS. 2A-2D depict various views of one of the present keys for use with some embodiments of the present single-latch locks.
Figure 2B:
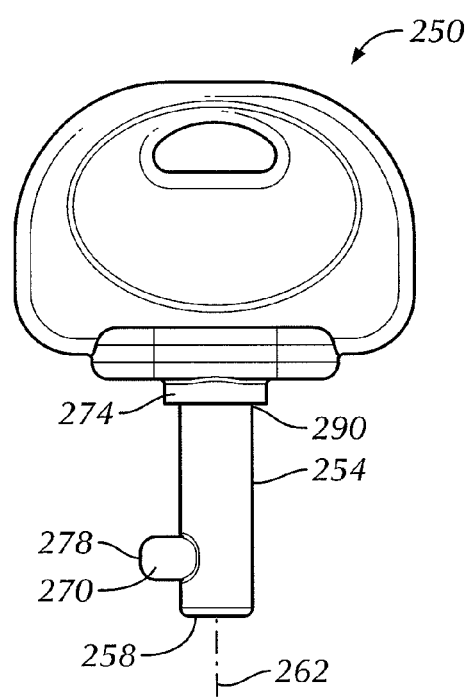
Figure 2C:
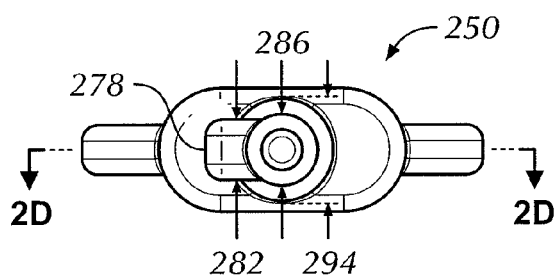
Figure 2D:
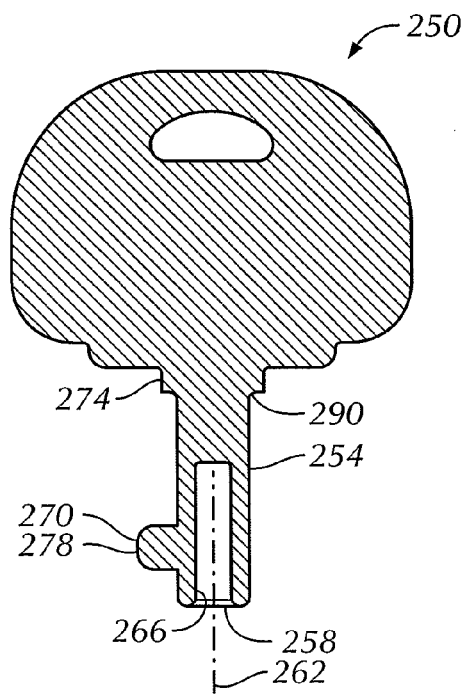
Figure 3A:
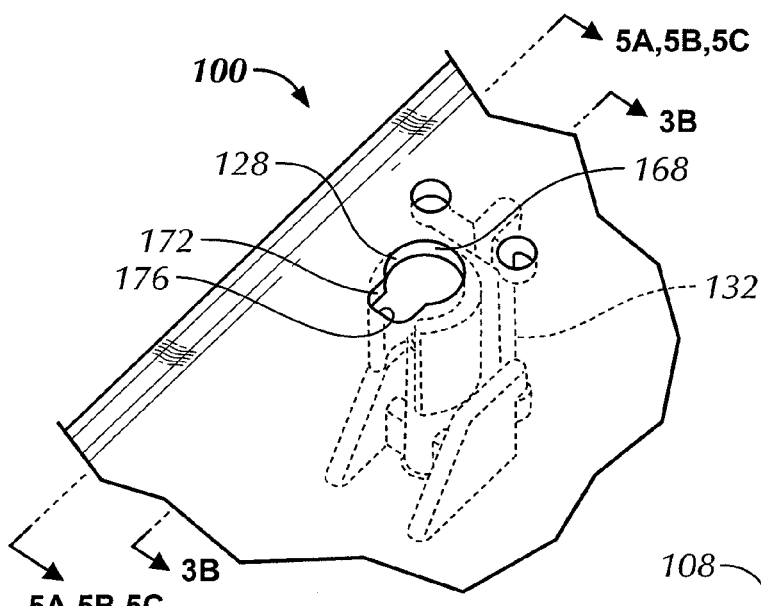
FIG. 3A depicts an enlarged perspective view of one of the present single-latch locks having a first lock portion and a second lock portion.
Figure 3B:
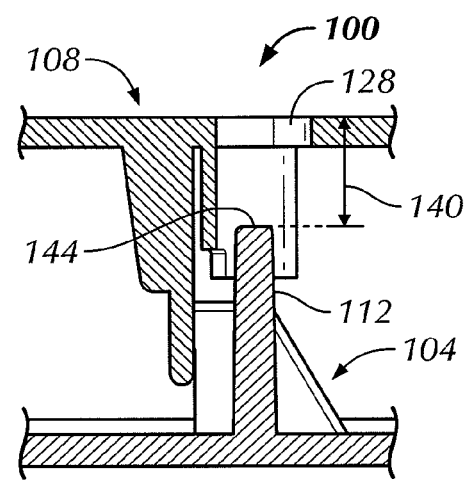
FIG. 3B depicts a cross-section view taken along line 3B-3B in FIG. 3A.
Figure 4A:
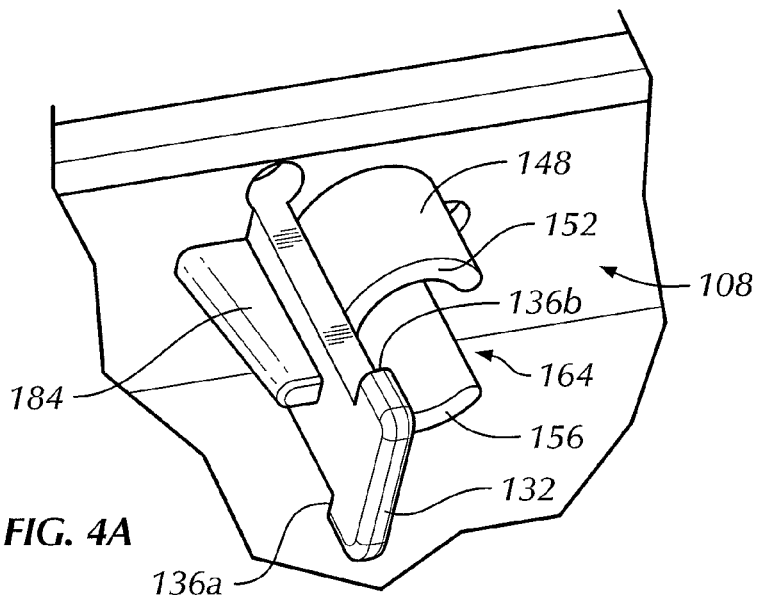
FIG. 4A-4D depict various views of the second lock portion of the single-latch lock of FIGS. 3A-3B.
Figure 4B:
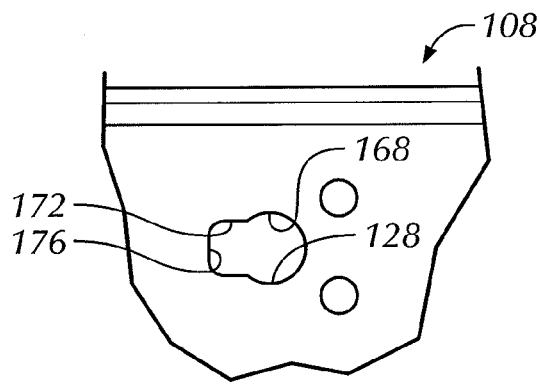
Figure 4C:
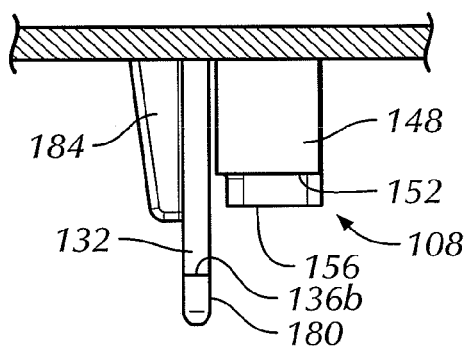
Figure 4D:
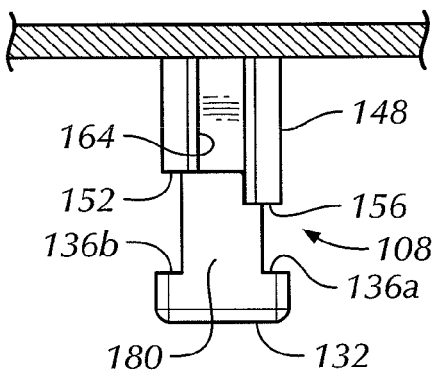
Figure 5A:
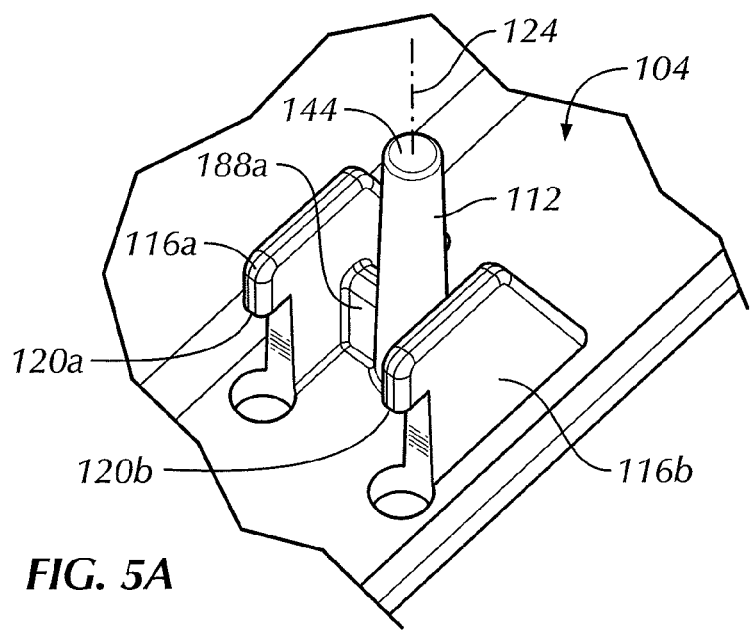

The term "coupled" is defined as connected, although not necessarily directly, and not necessarily mechanically; two items that are "coupled" may be integral with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a device or structure that is configured in a certain way is configured in at least that way, but it can also be configured in other ways than those specifically described. As used in this disclosure, a part or component that is unitary with another part or component means that the parts are of a physically continuous piece of material (e.g., are not physically separate from one another). For example, a receptacle with a unitary first lock portion can be molded as a single piece of material that includes the receptacle and the first lock portion. Similarly, a receptacle with a unitary first lock portion can be formed of a single piece of material that is machined to include the receptacle and first lock portion.

Referring now to the drawings, and more particularly to FIGS. 1-7, shown therein and designated by the reference numeral 10 is an embodiment of a loadable (and, in this case, reloadable) pest-control device 10. In the embodiment shown, reloadable pest-control device 10 comprises a rodent bait station and may be interchangeably referred to as bait station 10 or station 10. In some embodiments, bait station 10 comprises bait (e.g., poisoned bait) 12 (e.g., in any suitable form, such as, for example, solid, granular, liquid, etc.). The bait may be characterized as bait designed to kill pests (e.g., rodents such as mice or rats). However, it should be understood that in other embodiments, loadable pest-control device 10 can comprise any suitable loadable and/or reloadable pest-control device 10 (e.g., a reloadable pest-control device comprising a receptacle and a door), such as, for example, an insect bait station. In some embodiments, station 10 comprises an aerosol container configured to dispense pest attractant and/or poison. Furthermore, the present locks may be used with (either coupled to or unitary with) any device that is configured to be closed and opened, such as, for example: air fresheners, bird feeders and/or dispensers (e.g., dispensers for liquids, powders, food products, or paper goods, CDs, DVDs, video and/or audio cassette tapes, game pieces, office supplies, hardware, ammunition, fishing bait, and/or fish supplies). In some embodiments, the container and/or dispenser comprising the lock comprises one or more contents (e.g., one or more CDs and/or DVDs, rounds of ammunition, fishing bait, and/or the like).

In the embodiment shown, station 10 comprises a receptacle 14 (which may also be characterized as a base); and a door 18 coupled to receptacle 14. In the embodiment shown, door 18 is coupled to receptacle 14 by hinges 22. In other embodiments, door 18 can be coupled to receptacle 14 by any suitable structure and/or can be unitary with receptacle 14 (such that door 18 and receptacle 14 are comprised of the same piece of material and connected through a so-called living hinge). In the embodiment shown, station 10 is coupled to a weighted tray 26 (e.g., to provide stability to station 10 and/or to inhibit or reduce the likelihood of station 10 moving if a rodent enters station 10 (e.g., through opening 30)). In other embodiments, the weighted material is not positioned in a tray, such as, for example, in U.S. application Ser. No. 12/186,436, filed Aug. 5, 2008 and published as U.S. 2010/0031557, which is incorporated by reference. Station 10 can be coupled to tray 26 by any suitable fastener or structure. For example, in the embodiment shown, receptacle 14 is coupled to tray 26 by bolts or screws 34 and frusto-conical nuts 38. Nuts 38 can be, for example, unitary with tray 26. In other embodiments, any suitable fasteners can be used in addition to or in place of bolts or screws 34 and/or frusto-conical nuts 38 (e.g., hexagonal nuts, interlocking tabs, adhesive, or the like). Moreover, in other embodiments, any bait station— whether designed for rodents (e.g., rats and/or mice) or other pests—can be used in place of the depicted embodiment of station 10.

In the embodiment shown, station 10 (e.g., at least one of and/or both of receptacle 14 and lid 18) comprises plastic. For example, in some embodiments, receptacle 14 and/or door 18 comprises a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, station 10 (e.g., at least one of and/or both of receptacle 14 and lid 18) comprises a non-plastic material, such as, for example, a metal (e.g., steel, iron, aluminum, copper, brass, or the like), fiberglass, carbon fiber, synthetic materials, and/or other suitably durable and/or rigid materials.

In the embodiment shown, station 10 comprises a lock 100 that is configured to be operated (e.g., unlocked once locked and/or otherwise actuated) with a key 250 that can be inserted into lock 100 (e.g., to unlock lock 100 when locked and/or otherwise actuate lock 100). In the embodiment shown, lock 100 comprises: a first lock portion 104 and a second lock portion 108. First lock portion 104 has a post 112, two laterally spaced members 116a, 116b each defining a barb 120a, 120b, respectively, and a longitudinal axis 124 extending through substantially the center of post 112. In the embodiment shown, members 116a and 116b are spaced apart from post 112, and all three are unitary with and extends (up) from receptacle 14. In the embodiment shown, first lock portion 104 further comprises web portions 188a, 188b extending between post 112 and members 116, 116b, respectively. Second lock portion 108 defines an opening 128 and has a latch member 132 on a side of opening 128. Latch member 132 has opposing lateral protrusions 136a, 136b.

Figure 6A:
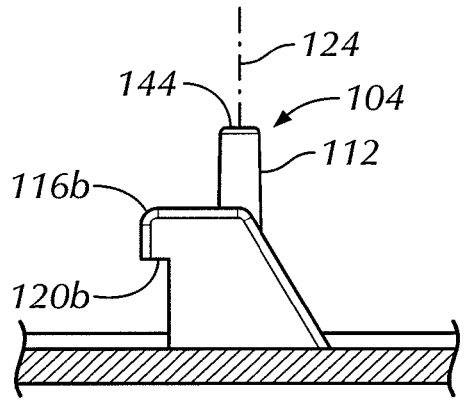
FIG. 6A depicts a cutaway view of the key of FIGS. 2A-2D in the lock of FIGS. 3A-3B with the lock in a locked position.
Figure 6A:
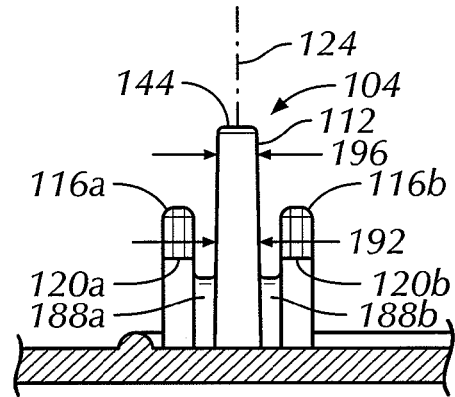
Figure 6A:
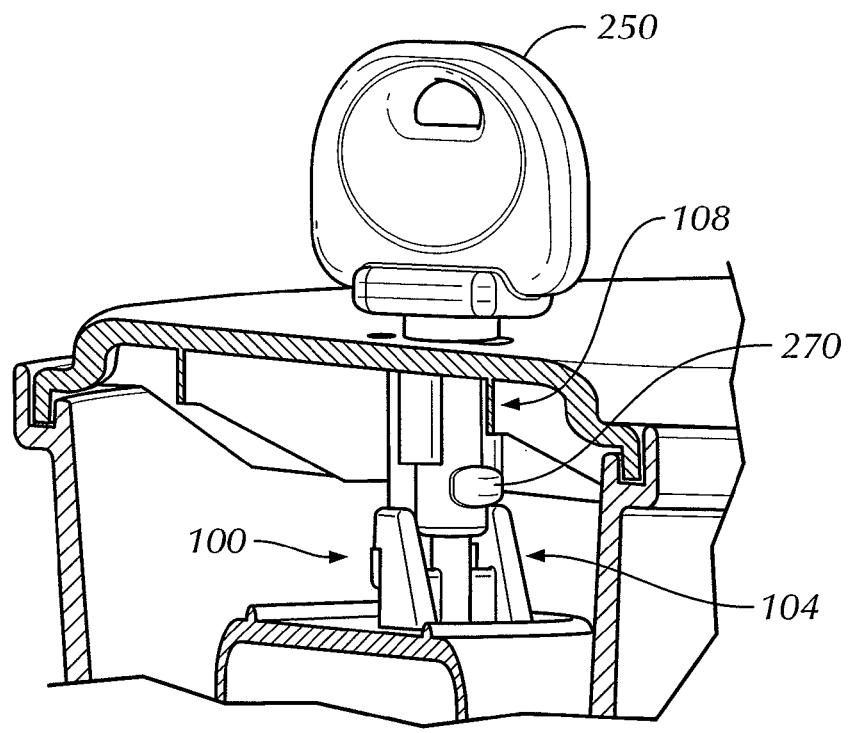
Figure 6B:
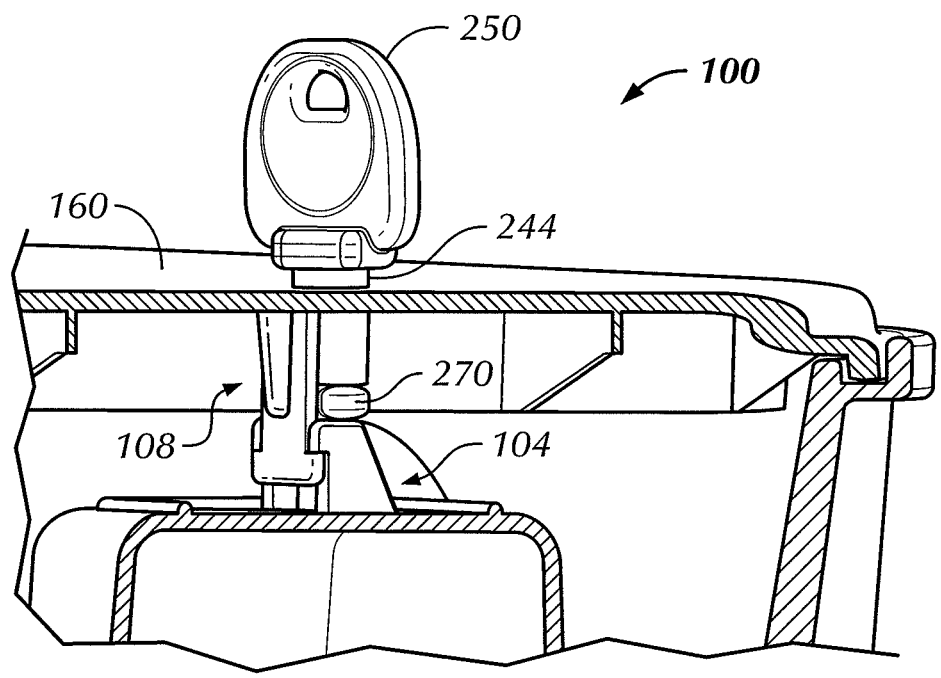
FIG. 6B depicts a cutaway view of the key of FIGS. 2A-2D in the lock of FIGS. 3A-3B with the lock in a locked position and the key rotated from its position in FIG. 6A.

As illustrated, for example, in FIGS. 6A and 6B, in the embodiment shown, second lock portion 108 is configured to engage first lock portion 104 such that longitudinal axis 124 of first lock portion 104 extends through opening 128, and lateral protrusions 136a, 136b of latch member 132 contact barbs 120a, 120b, respectively to resist separation of first and second lock portions 104 and 108, respectively. Additionally, in the embodiment shown, second lock portion 108 is configured to receive key 250 having a longitudinal axis 254 such that key 250 extends through opening 128 and longitudinal axis 262 of key 250 is angled no more than 30 degrees relative to (e.g., is substantially parallel to) longitudinal axis 124 of post 112.

In the embodiment shown, second lock portion 108 is configured to engage first lock portion 104 such that the longitudinal distance 140 between top 144 of post 112 and opening 128 (e.g., the top of opening 112, as indicated) is 0.25 inches or less is 0.25 inches or less (e.g., less than, equal to, or between any of 0.1, 0.15, 0.2, and/or 0.25 inches). In other embodiments, top 128 of post 112 can be any suitable longitudinal distance from opening 128 when second lock portion 108 engages first lock portion 104.

Figure 6C:
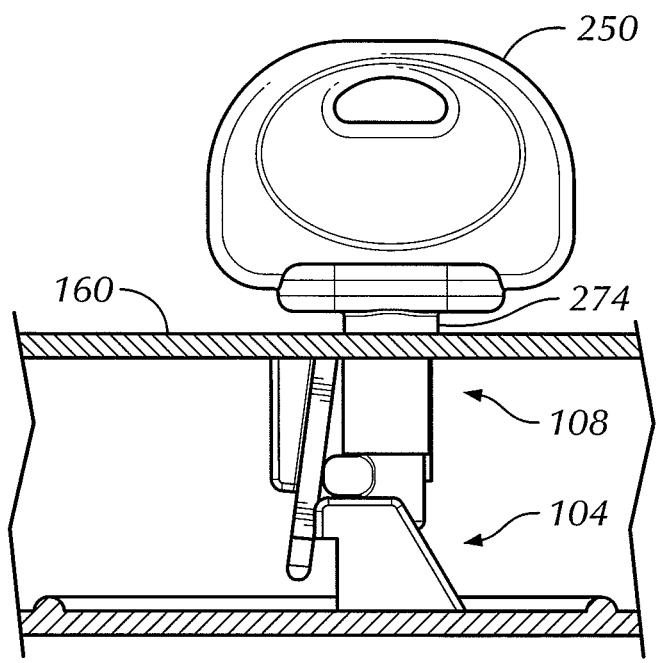
FIG. 6C depicts a cutaway view of the key of FIGS. 2A-2D in the lock of FIGS. 3A-3B with the lock in an unlocked position.

In the embodiment shown, second lock portion 108 is also configured to receive key 250 having a shaft 254 with an end 258 and a longitudinal axis 262 (extending through substantially the cross-sectional center of end 258), a recess 266 in end 258, and a lateral protrusion 270, such that: if key 250 is inserted through opening 128 less than a minimum insertion distance, the key is substantially prevented from rotating, and if key 250 is inserted through opening 128 between the minimum insertion distance and a maximum insertion distance the key is permitted to rotate such that if second lock portion 108 engages first lock portion 104, lateral protrusion 270 pushes latch member 132 away from barbs 120a, 120b to permit separation of first and second lock portions 104 and 108, respectively (e.g., as is illustrated sequentially in FIGS. 6A-6C, with latch member 128 fully separated from barbs 120a and 120b in FIG. 6C).

Additionally, in some embodiments, second lock portion 108 is configured such that if key 250 is inserted through opening 128 between the minimum and maximum insertion distances, the key is only permitted to rotate in a limited range of rotation. For example, in the embodiment shown, second lock portion 108 includes a collar 148 at least partially between opening 128 and latch member 132, where collar 148 defining the limited range of rotation (e.g., 180 degrees). More particularly, in the embodiment shown, collar 148 has a short portion 152 that defines the minimum insertion distance (e.g., key 250 must be inserted the minimum insertion distance before protrusion 266 will clear or extend past short portion 152 of collar 148 and permit the key to rotate. In the embodiment shown, collar 148 also has a long portion 156 that defines the limited range of rotation. For example, in the embodiment shown, key 250 has an enlarged base 274 (enlarged relative to shaft 250) such that insertion of the key is limited when base 274 contacts an upper surface 160 of second lock portion 108 (at the maximum insertion distance). Collar 148 and, more specifically, long portion 156 of collar 148, is configured such that at the maximum insertion distance (where base 274 of key 250 contacts surface 160) long portion 156 prevents protrusion 270 (and thereby key 250) from rotating beyond the limited range of rotation. In the embodiment shown, collar is configured such that the limited range of rotation includes 180 degrees (i.e., key 250 is permitted to rotate 180 degrees). In other embodiments, collar 148 and/or other parts of second lock portion 108 can be configured such that the limited range of rotation is any suitable size (e.g., equal to or greater than 60, 75, 90, 105, 120, 135, or 150 degrees).

In the embodiment shown, collar 148 includes a longitudinal channel or opening 164 extending along the length of collar 148 between short portion 152 and long portion 156 to permit protrusion 270 of key 250 to pass through collar 148 when key 250 is suitably aligned relative to collar 148 (e.g., as shown in FIG. 6A).

In the embodiment shown, opening 128 has a primary portion 168 and a lateral portion 172 shaped to receive lateral protrusion 270 of key 250, and where the limited range of rotation is or extends between a first position (as shown in FIG. 6A) in which lateral protrusion 270 is aligned with lateral portion 172 of opening 128 and a second position (as shown in FIG. 6C) in which lateral protrusion 270 is aligned with latch member 132 of first lock portion 104. In the embodiment shown, lateral portion 172 of opening 128 has a substantially linear outer end 176 (e.g., that is substantially perpendicular to axis 124 when second lock portion 108 engages first lock portion 104). In other embodiments, a protrusion (not shown) extends into lateral portion 172 (e.g., from outer end 176) toward primary portion 168 of opening 128, and/or later protrusion 270 of key 250 includes a corresponding notch (not shown) such that the shape of the key corresponds to the shape of the opening and only certain keys can be inserted through the opening.

In the embodiment shown, latch member 132 has a substantially planar surface 180, second lock portion 108 further comprises a web member 184, and web member 184 is substantially perpendicular to surface 180 of latch member 132. In some embodiments, web member 184 is coupled to latch member 132. For example, in the embodiment shown, web member 184 is unitary with latch member 132. As illustrated, in the embodiment shown, web member 184 is on an opposite side of latch member 132 than surface 180.

In the embodiment shown, lock 100 is configured such that if lateral protrusions 136a, 136b of latch member 132 contact barbs 120a, 120b, respectively, of first lock portion 104 to resist separation of first and second lock portions 104 and 108, respectively, web member 184 is substantially parallel to longitudinal axis 124 of post 112.

In the embodiment shown, a lower portion of post 112 (e.g., just above web portions 188a, 188b) has a maximum transverse dimension 192 (e.g., greatest width or greatest diameter) of at least 0.125 inches oriented (measured) perpendicular to longitudinal axis 124. In other embodiments, dimension 192 can be any suitable dimension, such as, for example, equal to, greater than, or between any of: 0.125, 0.15, 0.2, 0.25, 0.30, 0.35, 0.4, 0.45, and/or 0.5 inches.

In the embodiment shown, post 112 has a shape (e.g., a cross-sectional shape) that tapers from a base area (e.g., at transverse dimension 192; and, more specifically, a base cross-sectional area (e.g., at transverse dimension 192)) adjacent (e.g., just above) web portions 188a, 188b to a top area (e.g., at top 144; and, more specifically, a top cross-sectional area (e.g., at transverse dimension 196)) that is smaller than the base area. For example, in the embodiment shown, the longitudinal portion of post 112 between web portions 188a, 188b and top 144 has a substantially circular shape (e.g., in a plane transverse to axis 124), and diameter 192 is larger than diameter 196, such that the perimeter at diameter 196 (and, in this embodiment, the cross-sectional area at diameter 196) is smaller than the perimeter of the post at diameter 192 (and, in this embodiment, the cross-sectional area at diameter 192); and the perimeter (and, in this embodiment, the cross-sectional area) of post 112 decreases as the distance from top 144 decreases. While transverse dimensions 192 and 196 are described as diameters, in embodiments with non-circular cross-sectional shapes, transverse dimensions (e.g., maximum transverse dimensions) 192 and 196 may not be diameters. Transverse dimensions 192 and 196 can be any suitable size relative to one another. For example, in some embodiments, dimension 196 is less than, equal to, or between any of: 10, 20, 30, 40, 50, 60, 70, 80, 90, 95, and/or 99 percent of dimension 192.

In some embodiments, first lock portion 104 and/or second lock portion 108 are modular and/or not unitary with station 10 (e.g., not unitary with receptacle 14 and/or lid 18). For example, in some embodiments, station 10 comprises a metal or other non-plastic material, and first lock portion 104 and/or second lock portion 108 comprise plastic and are configure to be coupled to receptacle 14 or lid 18, respectively. In some embodiments, one or each of first lock portion 104 and second lock portion 108 comprises a plastic, such as, for example, a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, first lock portion 104 comprises a non-plastic material, such as, for example, a metal (e.g., steel, iron, aluminum, copper, brass, or the like), fiberglass, carbon fiber, synthetic materials, and/or other suitably durable and/or rigid materials.

Some embodiments of the present kits comprise one or more (e.g., two) of the present locks 100. Some embodiments of the present kits comprise one or more of the present keys 250. In the embodiment shown, lock 100 is configured to be unlocked by key 250. In the embodiment shown, key 250 comprises a shaft 254 having an end 258 and a longitudinal axis 262 extending through end 258 (in particular, through substantially the center of shaft 254). In the embodiment shown, key 250 has or defines an opening 266 extending into shaft 254 from end 258. In the embodiment shown, key 250 is configured to be inserted into opening 128 of second lock portion 108 such that post 112 of first lock portion 104 extends into opening 266 in shaft 254 and key 250 can be rotated (e.g., by 180 degrees) to spread latch member 132 to permit separation of first and second lock portions 104 and 108 (e.g., FIG. 6C). In the embodiment shown, shaft 254 is substantially cylindrical and has a circular cross-sectional shape. In other embodiments, shaft 254 can have any suitable cross-sectional shape (e.g., square, triangular, hexagonal, octagonal, or the like) and/or can be non-cylindrical.

In the embodiment shown, latch member 132 comprises a resilient material (e.g., a resilient plastic) such that latch member 132 is biased toward its resting (locked) position. For example, in the embodiment shown, latch member 132 comprises a resilient material such that if key 250 is inserted through opening 128 and rotated 180 degrees, latch member 132 is spread apart from post 120 and lock 100 is unlocked as shown in FIG. 6C; but if key is rotated back (e.g., to 170 or 175 degrees) from the insertion position, latch member 132 attempts to return to its resting state and thereby return lock 100 to a locked configuration. In this way, in the embodiment shown, second lock portion 108 is biased toward a locked position such that if second lock portion 108 engages or is in a position to engage first lock portion 104, second lock portion 108 will default to a locked configuration (e.g., if key 250 is not inserted and rotated sufficiently to disengage second lock portion 108 from first lock portion 104 (e.g., to unlock lock 100).

In the embodiment shown, key 254 comprises a protrusion 270 extending outward from shaft 254 to an outer end 278. In the embodiment shown, protrusion 270 has a width 282 that is less than (e.g., equal to, at least, or between any of: 70, 80, 90, and/or 95 percent of) the maximum transverse dimension (e.g., diameter) 286 of shaft 254. In the embodiment shown, protrusion 270 is (e.g., a longitudinal axis of each of the protrusions is) substantially perpendicular to longitudinal axis 262 of shaft 254. In the embodiment shown, outer end 278 of protrusion 270 has a substantially linear outer edge (e.g., that is substantially perpendicular to axis 262). In other embodiments, outer end 278 includes a notch (not shown) extending into the protrusion toward longitudinal axis 262 of shaft 254.

In the embodiment shown, outer end 278 of protrusion 270 is configured to contact a planar surface (e.g., substantially planar surface 184) to resist rotation of key 250 around longitudinal axis 262. For example, in the embodiment shown, outer end 278 of protrusions 270 is configured to contact a planar surface such that at least two points (e.g., a point on each side of outer end 278) simultaneously contact the planar surface (e.g., substantially planar surface 184). In the embodiment shown, latch member 132 has a substantially planar inner surface 184; key 250 is configured to be inserted into opening 128 such that post 112 extends into opening 266 in shaft 254, and if key 250 is rotated such that protrusion 270 spreads latch member 132, outer end 278 of the protrusion will contact latch member 132 (e.g., will contact substantially planar surface 184) to resist rotation of key 250 relative to second lock portion 108.

In the embodiment shown, key 250 can be inserted into opening 128 and rotated substantially 180 degrees to unlock lock 100 (e.g., to place lock 100 in an un-locked configuration in which second lock portion 108 can be separated from first lock portion 104), and the key 250 (e.g., outer end 278) will contact second lock portion 108 (e.g., surface 184) to resist rotation of key 250 relative to second lock portion 108 such that key 250 is substantially retained in second lock portion 108 while second lock portion 108 is separated from 104 (e.g., to resist the likelihood of key 250 being misplaced or lost while the lock is in the un-locked configuration).

In the embodiment shown, key 250 comprises a base 274 at a proximate end 290 of shaft 254. In the embodiment shown, base 278 is substantially cylindrical and has a substantially circular cross-sectional shape. In other embodiments, base 278 can have any suitable configuration, including, for example, the configurations examples listed above for shaft 254. In the embodiment shown, base 278 is configured to contact upper surface 160 of second lock portion 108 to define the maximum insertion distance of key 250 into opening 128 (e.g., when key 250 is inserted into opening 128 to operate, actuate, or unlock lock 100 (e.g., permit second lock portion 108 to disengage first lock portion 104)). In the embodiment shown, base 278 has a transverse dimension (e.g., a maximum transverse dimension, such as, for example, a diameter) 294 that is greater than transverse dimension 286 of shaft 254 (dimension 286 is less than, e.g., equal to, at least, or between any of 70, 80, 90, and/or 95 percent of dimension 294). Further, the perimeter of base 278 (taken perpendicular to axis 262) is greater than the perimeter of shaft 254 at dimension 286, and in other embodiments this may be true for different configurations of base 278 and shaft 254.

In some embodiments, key 250 comprises a plastic, such as, for example, a plastic selected from the group consisting of polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In other embodiments, key 250 comprises a non-plastic material, such as, for example, a metal (e.g., steel, iron, aluminum, copper, brass, or the like), fiberglass, carbon fiber, synthetic materials, and/or other suitably durable and/or rigid materials.

Figure 7:
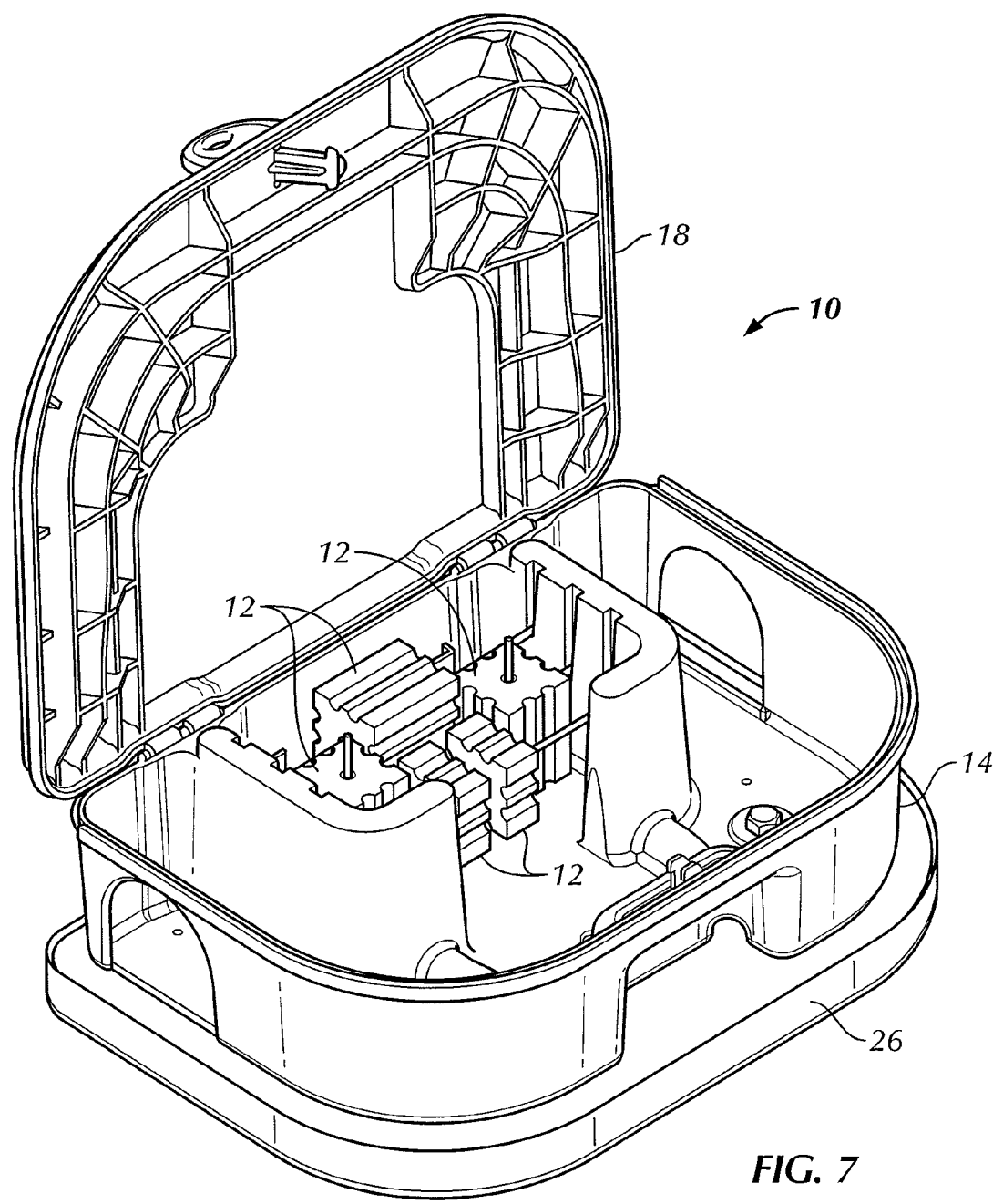
FIG. 7 depicts a perspective view of the rodent bait station of FIG. 1 with the lid of the bait station open.
Figure 8:
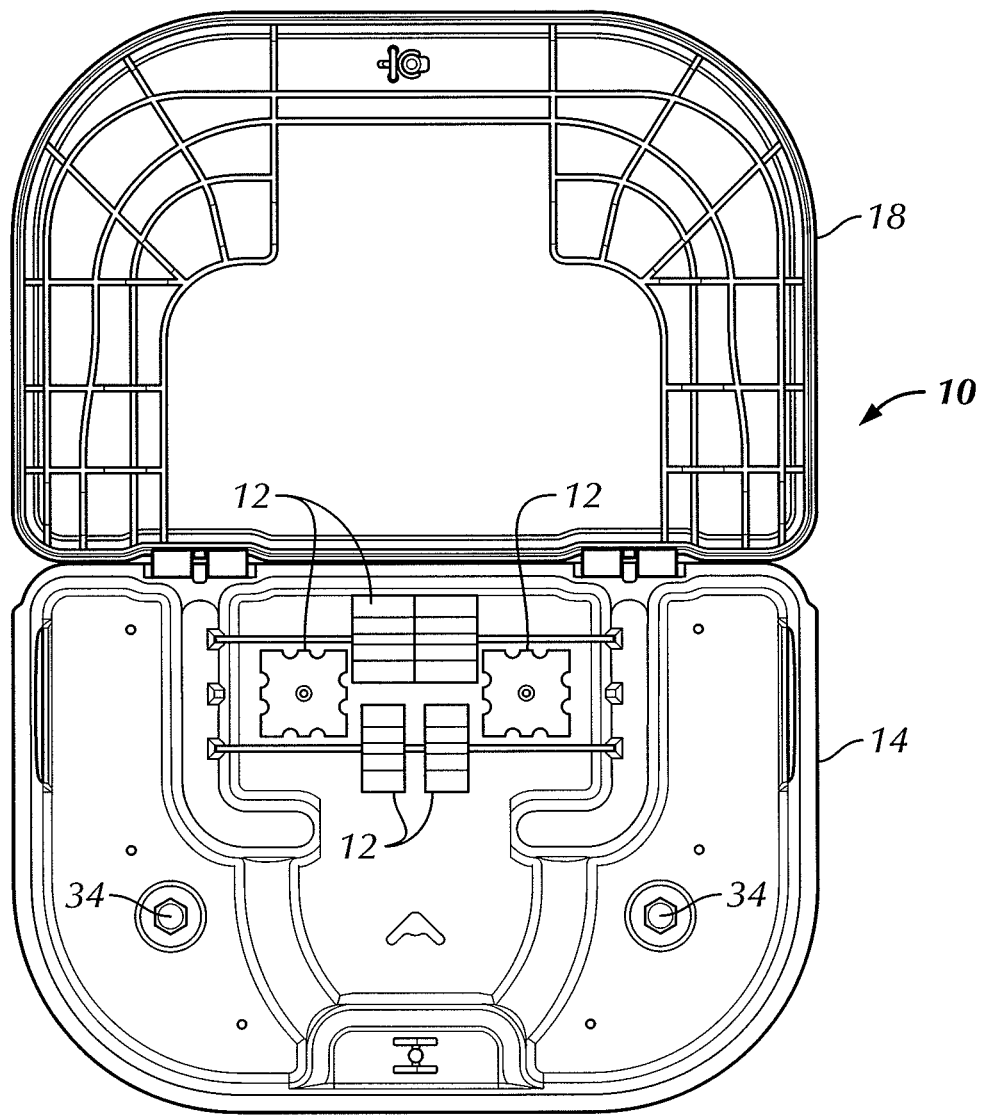
FIG. 8 depicts a top view of the bait station of FIG. 1 with the lid of the bait station open.
Figure 9:
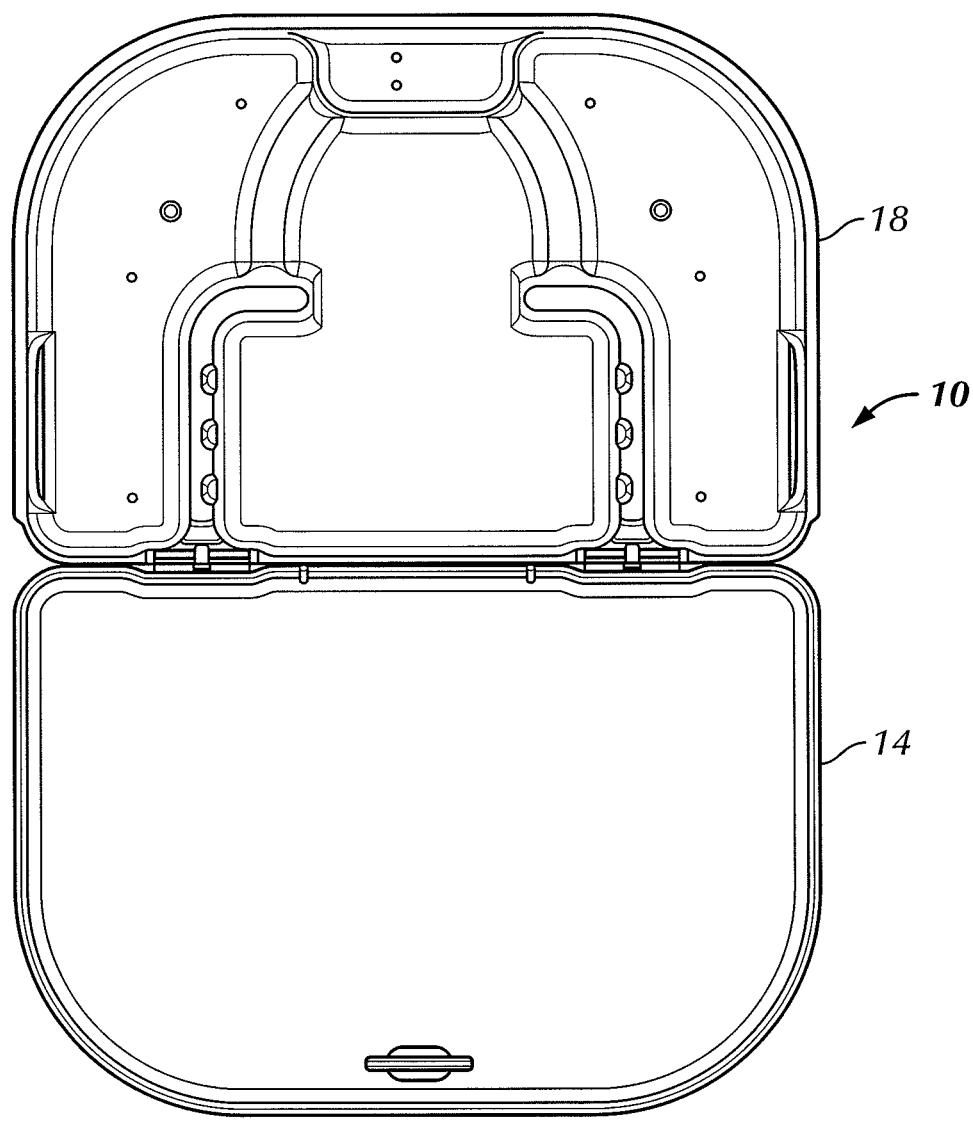
FIG. 9 depicts a bottom view of the bait station of FIG. 1 with the lid of the bait station open.
Figure 10:
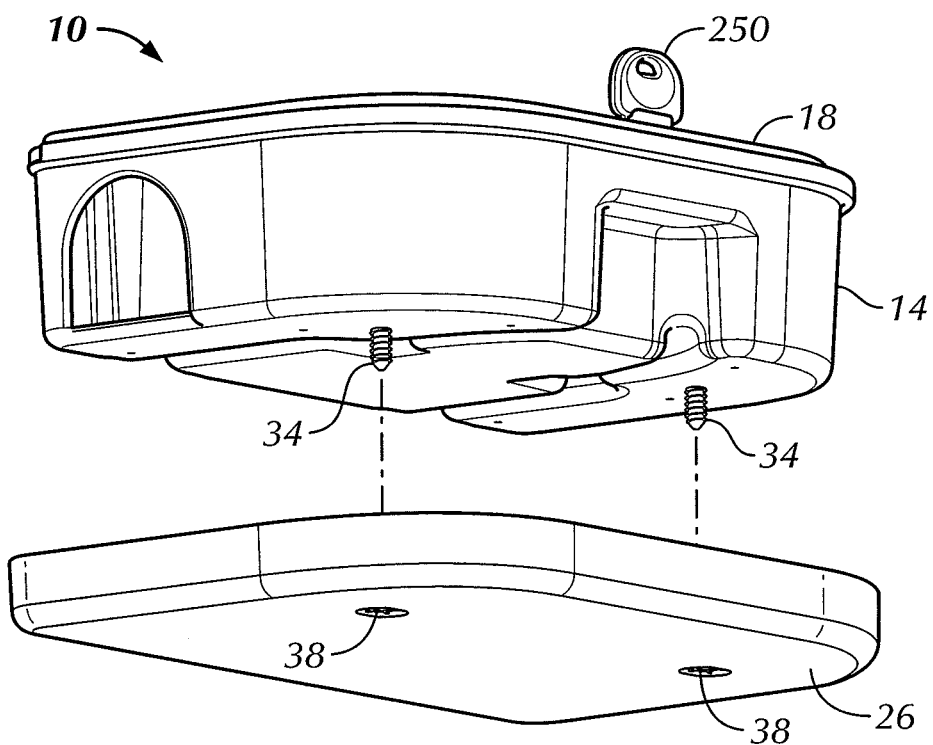
FIG. 10 depicts a partially exploded lower perspective view of the bait station of FIG. 1.
Figure 11:
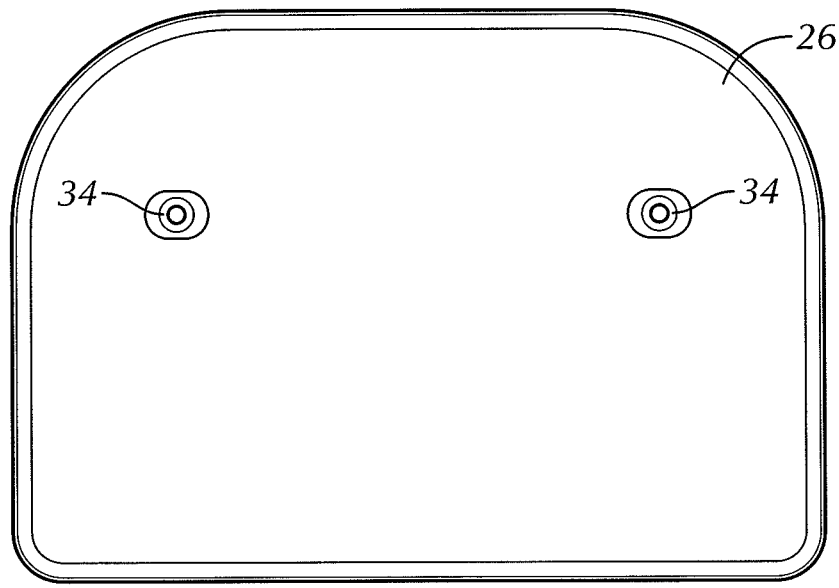
FIG. 11 depicts a bottom view of a weighted tray for use with embodiment of the present rodent bait stations.

The various illustrative embodiments of the present devices and kits are not intended to be limited to the particular forms disclosed. Rather, they include all modifications, equivalents, and alternatives falling within the scope of the claims. For example, embodiments other than the one shown may include some or all of the features of the depicted embodiment. As another example, a given kit may include bait, such as bait designed to kill a rodent (and as shown in FIG. 7). A given kit may also be enclosed in packaging, such as shrink wrap, a box (e.g., made from plastic, cardboard, a combination of the two, or any other suitable material). In some embodiments, the present devices include a single key, such as key 250, that is enclosed in packaging without any other devices, such as in the type of packaging described above.

The claims are not intended to include, and should not be interpreted to include, means-plus- or step-plus-function limitations, unless such a limitation is explicitly recited in a given claim using the phrase(s) "means for" or "step for," respectively.

The invention claimed is:
1. A pest-control device comprising:
  a lock comprising:
    a first lock portion having a post, two laterally spaced members each defining a barb extending away from the post, and a longitudinal axis extending through substantially the center of the post; and a second lock portion defining an opening and having a latch member on a side of the opening, the latch member having opposing lateral protrusions;

where the second lock portion is configured to engage the first lock portion such that:

the longitudinal axis of the first lock portion extends through the opening, and the lateral protrusions of the latch member contact the barbs of the first lock portion to resist separation of the first and second lock portions; and where the second lock portion is configured to receive a key having shaft with a longitudinal axis such that the shaft of the key extends through the opening and the longitudinal axis of the shaft is angled no more than 30 degrees relative to the longitudinal axis of the post;

a receptacle; and a door coupled to the receptacle;

where the first lock portion is coupled to one of the receptacle and the door, and the second lock portion is coupled to the other of the receptacle and the door.

2. The pest-control device of claim 1, where the door is unitary with the receptacle.

3. The pest-control device of any of claims 1-2, where the second lock portion is configured to receive a key having a shaft with a longitudinal axis, a recess in an end of the key, and a lateral protrusion, such that:

if the key is inserted through the opening less than a minimum insertion distance the key is substantially prevented from rotating, and if the key is inserted through the opening between the minimum insertion distance and a maximum insertion distance the key is permitted to rotate such that if the second lock portion engages the first lock portion the lateral protrusion of the key pushes the latch member away from the barbs to permit separation of the first and second lock portions.

4. The lock of claim 3, where the latch member has a substantially planar surface, the second lock portion further comprises a web member, and the web member is substantially perpendicular to the substantially planar surface of the latch member.

5. The pest-control device of claim 4, where if the lateral protrusions of the latch member contact the barbs of the first lock portion to resist separation of the first and second lock portions, the web member is substantially parallel to the longitudinal axis of the post of the first lock portion.

6. The pest-control device of claim 1, where the first lock portion is unitary with the receptacle, and the second lock portion is unitary with the door.

7. The pest-control device of claim 1, where the reloadable pest-control product comprises a rodent bait station.

8. The pest-control device of claim 1, where the pest-control device comprises an insect bait station.

9. The pest-control device of claim 1, where at least one of the receptacle and lid comprises a plastic.

10. The pest-control device of claim 1, where the second lock portion is configured such that if the key is inserted through the opening between the minimum and maximum insertion distances the key is only permitted to rotate in a limited range of rotation.

11. The pest-control device of claim 10, where the second lock portion includes a collar at least partially between the opening and the latch member, the collar defining the limited range of rotation.

12. The pest-control device of claim 11, where the second lock portion includes a collar at least partially between the opening and the latch member, the collar defining the minimum insertion distance.

13. The pest-control device of claim 10, where the opening of the second lock portion has a primary portion and a lateral portion shaped to receive the lateral protrusion of the key, and where the limited range of rotation is between a first position in which the lateral protrusion of the key is aligned with the lateral portion of the opening and a second position in which the lateral protrusion of the key is aligned with the latch member of the first lock portion.

* * * * *